(12) United States Patent
Murakami et al.

(10) Patent No.: US 7,548,359 B2
(45) Date of Patent: Jun. 16, 2009

(54) DOUBLE-WAVELENGTH LIGHT SOURCE UNIT AND OPTICAL HEAD DEVICE HAVING FOUR DIFFRACTION GRATINGS

(75) Inventors: Ryota Murakami, Koriyama (JP); Yoshiharu Ooi, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/125,188

(22) Filed: May 10, 2005

(65) Prior Publication Data

US 2005/0213444 A1    Sep. 29, 2005

Related U.S. Application Data

(63) Continuation of application No. PCT/JP03/14386, filed on Nov. 12, 2003.

(30) Foreign Application Priority Data

Nov. 13, 2002 (JP) ............................. 2002-329724

(51) Int. Cl.
G02B 5/32 (2006.01)
G11B 7/135 (2006.01)

(52) U.S. Cl. .................... 359/15; 369/103; 369/112.04; 369/112.07; 369/44.37

(58) Field of Classification Search ............. 369/44.37, 369/121, 112.04, 112.17, 7, 135, 15, 103, 369/112.07; 359/19; G11N 7/135; G02B 5/32; G11B 7/135

See application file for complete search history.

(56) References Cited

U.S. PATENT DOCUMENTS 4,505,584 A * 3/1985 Kato et al. .................. 356/123

(Continued)

FOREIGN PATENT DOCUMENTS

JP    2000-76689    3/2000

(Continued)

OTHER PUBLICATIONS

MAT (Machine assisted translation) of JP 2000-249831 - no date - 15 pgs.*

(Continued)

*Primary Examiner*—Joseph H Feild
*Assistant Examiner*—Parul Gupta
(74) *Attorney, Agent, or Firm*—Oblon, Spivak, McClelland, Maier & Neustadt, P.C.

(57) ABSTRACT

A double-wavelength light source unit capable of stable signal detection, is realized.

The double-wavelength light source unit comprises a double-wavelength light source, a photodetector and a double-wavelength diffraction element, wherein the double-wavelength diffraction element comprises a diffraction grating which transmits a light beam of $\lambda_1$ and diffracts a light beam of $\lambda_2$ among the light beams of wavelengths $\lambda_1$ and $\lambda_2$ ($\lambda_1 \neq \lambda_2$) emitted from two laser diode diodes as the double-wavelength light source, a diffraction grating which diffracts a light beam of $\lambda_1$ and transmits a light beam of $\lambda_2$, a diffraction grating constituted by a grating-material forming a grating and a filler which transmits a light beam of $\lambda_1$ since the refractive indices of both of these materials are equal at $\lambda_1$ and diffracts a light beam of $\lambda_2$ since the refractive indices are different at $\lambda_2$, and a diffraction grating which transmits a light beam of $\lambda_1$ having a first polarization plane and diffracts a light beam of $\lambda_1$ having a polarization plane perpendicular to the first polarization plane.

14 Claims, 5 Drawing Sheets

U.S. PATENT DOCUMENTS

| | | | |
|---|---|---|---|
| 6,072,579 | A | 6/2000 | Funato |
| 6,122,241 | A * | 9/2000 | Akiyama et al. ....... 369/112.12 |
| 6,195,315 | B1 * | 2/2001 | Takahashi et al. ........ 369/44.23 |
| 6,366,548 | B1 | 4/2002 | Ohyama |
| 6,584,059 | B1 * | 6/2003 | Saimi et al. ............ 369/112.02 |
| 6,618,344 | B1 * | 9/2003 | Funato ................... 369/112.15 |
| 6,643,245 | B2 * | 11/2003 | Yamamoto et al. ..... 369/112.01 |
| 6,822,771 | B2 | 11/2004 | Funato |
| 2002/0018432 | A1 | 2/2002 | Ohuchida |

FOREIGN PATENT DOCUMENTS

| | | |
|---|---|---|
| JP | 2000-123403 | 4/2000 |
| JP | 2000-249831 * | 9/2000 |
| JP | 2001-216677 | 8/2001 |
| JP | 2002-150593 | 5/2002 |
| JP | 2002-288854 | 10/2002 |
| JP | 2002-342956 | 11/2002 |
| JP | 2003-338076 | 11/2003 |
| WO | WO 2004-032126 A1 | 4/2004 |

OTHER PUBLICATIONS

U.S. Appl. No. 11/125,188, filed May 10, 2005, Murakami, et al.
U.S. Appl. No. 12/195,889, filed Aug. 21, 2008, Sato, et al.

* cited by examiner

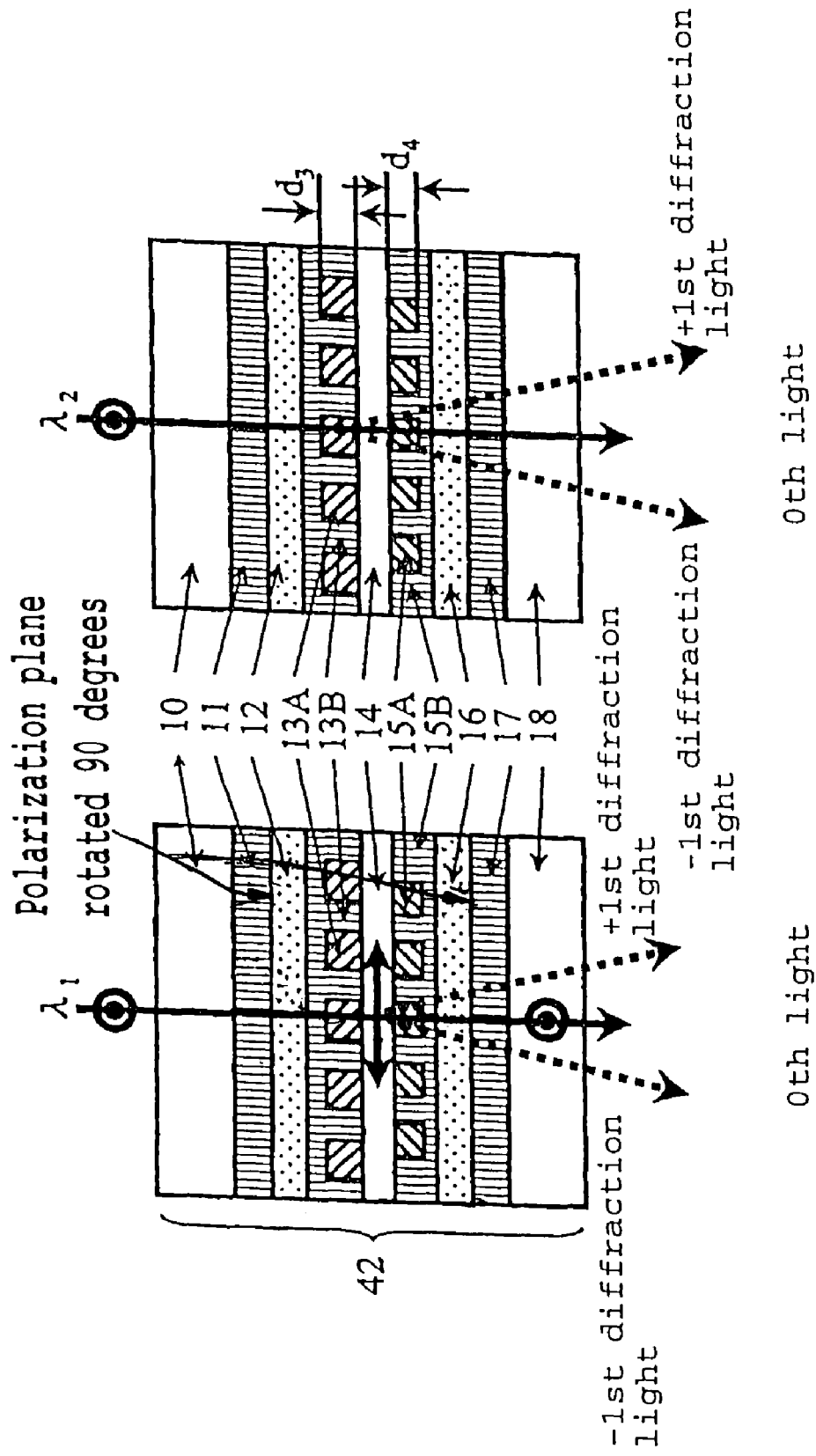

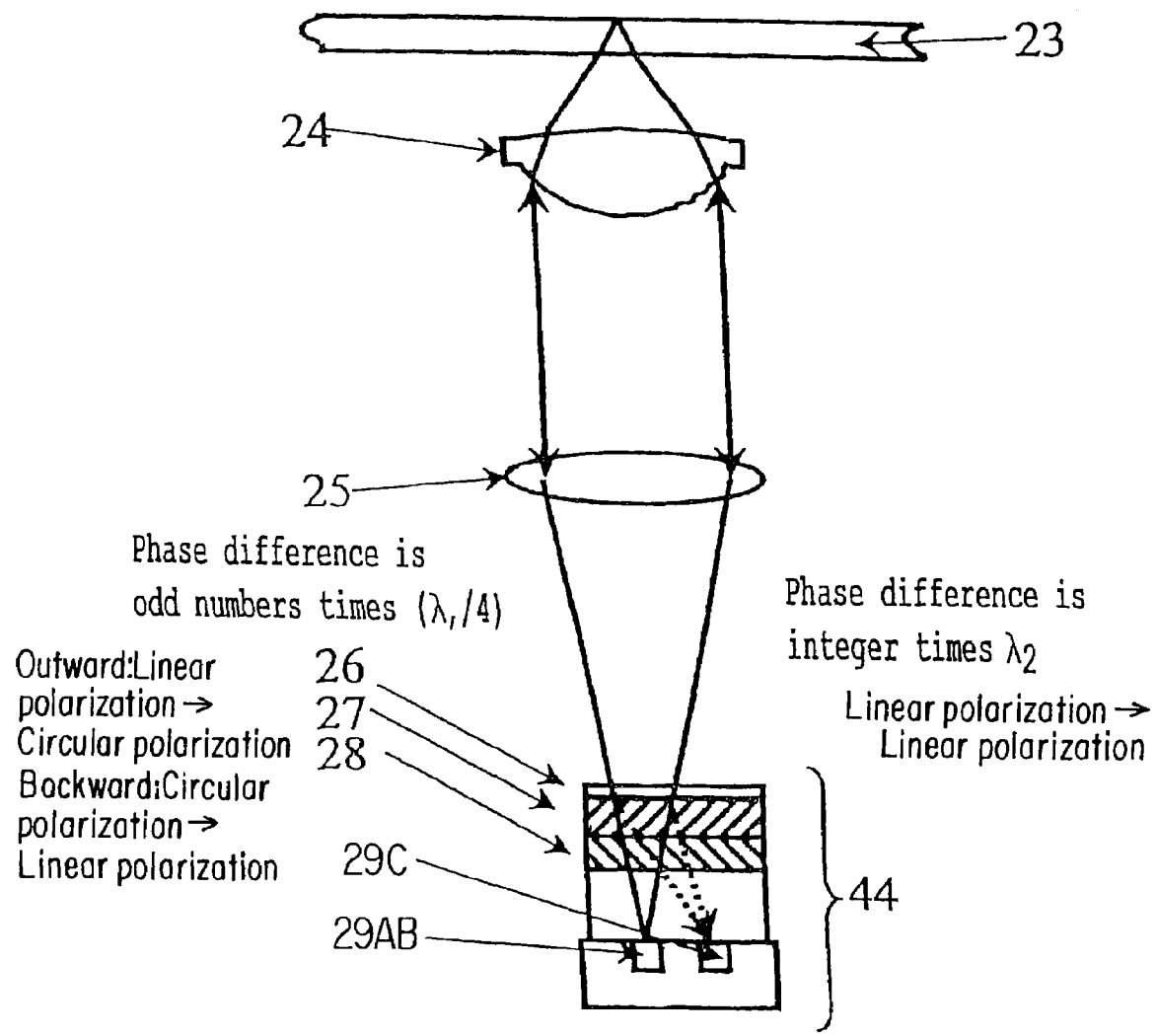

PRIOR ART

DOUBLE-WAVELENGTH LIGHT SOURCE UNIT AND OPTICAL HEAD DEVICE HAVING FOUR DIFFRACTION GRATINGS

TECHNICAL FIELD

The present invention relates to a double-wavelength light source unit and an optical head device, in particular to a double-wavelength light source unit to be used for an optical head device for recording or reproducing an information from at least two types of optical recording media such as optical disks, and to an optical head device employing it.

BACKGROUND ART

Heretofore, CD type optical disks such as CD-Rs or CD-RWs have been used as optical recording media. In recent years, DVD type optical disks having a large capacity such as DVD-RAMs or DVD-Rs are more popularly used as optical recording media.

Under the circumstances, a CD/DVD compatible optical head device has been practically used for recording or reproducing an information of CD and DVD optical disks as optical recording media having different specification, with a single optical head device. In particular, in a case of recording and reproducing an information in e.g. a CD-R employing a medium having high light-absorptivity in a 650 nm wavelength band for an optical recording medium layer, the optical head device needs to be provided with a laser diode of 790 nm wavelength band for CD in addition to a laser diode of 650 nm wavelength band for DVD.

FIG. 5 shows an example of the construction of a conventional CD/DVD compatible optical head device in which a light source unit 46 for CD in which a laser diode 35A of 790 nm wavelength band, photodetector 35B and a diffraction grating 35C are integrally formed, and a light source unit 45 for DVD in which a laser diode 34A of 650 nm wavelength band, a photodetector 34B and a diffraction element 34C are integrally formed, are separately disposed.

Light beams emitted from the laser diodes 34A and 35A are transmitted through the diffraction gratings 34C and 35C and combined into the same optical axis by a wavelength-combining prism 33, converted into parallel beams by a collimator lens 32 and converged on an information-recording plane of an optical disk 30 by an objective lens 31. The emitted light beams reflected by the information-recording plane become signal lights and converted again to parallel beams by the objective lens 31, converged by a collimator lens 30, and parts of the reflected signal lights are converged on planes of detectors 34B and 35B respectively by the diffraction elements 34C and 35C to be electrical signals.

In FIG. 5, diffraction gratings for generating tracking beams are formed on a light-source side of the diffraction elements 34C and 35C, and holographic beam splitters for converging the signal lights on photo-receiving planes of the detectors 34B and 35B are formed on the optical-disk side of the diffraction gratings 34C and 35C.

Further, such a construction is proposed, which employs a monolithic double-wavelength laser diode in which a laser diode of 790 nm wavelength band and a laser diode of 650 nm wavelength band are formed in one chip, or a double-wavelength laser diode in which laser chips for the two wavelength bands are disposed so that the distance between their emission points is about from 100 to 300 µm, whereby the number of parts can be reduced and down-sizing and low cost can be achieved as compared with conventional optical head devices in which each of the laser chips are disposed in the respective units.

This construction uses an element in which a monolithic double-wavelength laser diode in which a laser diode of 790 nm wavelength band and a laser diode of 650 nm wavelength band are formed in one chip, or a double-wavelength laser diode in which laser chips of these wavelength bands are disposed so that the distance between their emission points is about from 100 to 300 µm, and a photo-receiving element are integrally formed. In this case, the diffraction grating to be used for conventional 3-beam method or differential push-pull method and a holographic beam splitter for converging light to the photodetector, generate diffraction light of each of incident light beams of 790 nm wavelength band for CD and of 650 nm wavelength band for DVD, and the excess diffraction light becomes stray light and interfuses into the photodetector. Therefore, these arises a problem that recording and reproducing of signal can not be stably carried out.

Further, when only a diffraction grating is provided to be used for 3-beam method for CD, a light beam for DVD is diffracted by the diffraction grating for CD. Accordingly, the light intensity of light beam reaching to the optical disk is reduced, which prevents reproducing or recording of DVD type optical disk.

Further, when the diffraction grating to be used for the 3-beam method and a phase plate provided for reducing return light to minimize the variation of laser power, are respectively disposed, wavefront aberrations of the respective parts are summed up, and accordingly, there occurs a problem that the total wavefront aberration is increased.

Under the above circumstances, it is an object of the present invention to provide a double-wavelength light source unit which enables to stably detect a signal at the time of recording or reproducing an information from a CD type optical disk and a DVD type optical disk, in an optical head device employing a double-wavelength laser as a light source, and to provide an optical head device employing it.

DISCLOSURE OF THE INVENTION

The present invention provides a double-wavelength light source unit comprising a double-wavelength light source emitting two light beams of different wavelengths from different emission points, a photo detector and a double-wavelength diffraction element for transmitting the two light beams with different wavelengths, wherein the double-wavelength diffraction element comprises:

a first diffraction grating which transmits a light beam of one wavelength of the two emitted from the double-wavelength light source, without diffracting and diffracts at least a light beam having a polarization plane in the light beam of the other wavelength and converts it to a tracking beam, a second diffraction grating which diffracts at least a light beam having a polarization plane in a light beam of the one wavelength and converts it to a tracking beam, and transmits the light beam of the other wavelength without diffracting, and a diffraction grating which diffracts a detectable amount of at least a light beam of either one of the two wavelengths.

Further, the present invention provides the double-wavelength light source unit according to the above-mentioned, wherein the two light beams of different wavelengths are a light beam of wavelength $\lambda_1$, and a light beam of $\lambda_2$, which comprises:

the first diffraction grating which transmits a light beam of wavelength $\lambda_1$ without diffracting and diffracts at least a light beam having a polarization plane in a light beam of wavelength $\lambda_2$ and converts it to a tracking beam, the second diffraction grating which diffracts at least a light beam having a polarization plane in the light beam of wavelength $\lambda_1$ and converts it to a tracking beam and transmits the light beam of wavelength $\lambda_2$ without diffracting, a third diffraction grating which transmits the light beam of wavelength $\lambda_1$ without diffracting and diffracts a detectable amount of at least the light beam having a polarization plane in the light beam of wavelength $\lambda_2$, and a fourth diffraction grating which transmits a linearly polarized light beam of wavelength $\lambda_1$ having a first polarization plane, diffracts a detectable amount of a linearly polarized light beam of wavelength $\lambda_1$ having a second polarization plane perpendicular to the first polarization plane, and transmits a linearly polarized light beam of wavelength $\lambda_2$ having the first polarization plane.

Further, the present invention provides the double-wavelength light source unit according to the above-mentioned, which comprises:

the first diffraction grating which transmits a light beam of wavelength $\lambda_1$ without diffracting and diffracts a light beam of wavelength $\lambda_2$ and converts it to a tracking beam, the second diffraction grating which diffracts the light beam of wavelength $\lambda_1$ and converts it to a tracking beam and transmits the light beam of wavelength $\lambda_2$ without diffracting, the third diffraction grating which comprises a grating material forming a concavo-convex shaped grating and a filler filling the concavo-convex portion of the grating material, wherein the refractive indices of the grating material and the filler for the light beam of wavelength $\lambda_1$ are equal so as to transmit the light beam without diffracting and the refractive indices of the grating material and the filler are different for an incident light beam of wavelength of $\lambda_2$ so as to diffract the light beam of a detectable amount, and the fourth diffraction grating which transmits a linearly polarized light beam of wavelength $\lambda_1$ having a first polarization plane, diffracts a linearly polarized light beam of wavelength $\lambda_1$ having a second polarization plane perpendicular to the first polarization plane of a detectable amount, and transmits a linearly polarized light beam of wavelength $\lambda_2$ having the first polarization plane.

Further, the present invention provides the double-wavelength light source unit according to the above-mentioned, wherein a light-output side of the double-wavelength diffraction element is provided with a phase plate which generates a phase difference of an odd number times of $\lambda_1/4$ for a light beam of wavelength $\lambda_1$.

Further, the present invention provides the double-wavelength light source unit according to the above-mentioned, wherein the first diffraction grating and the second diffraction grating constitute a double-wavelength-selection diffraction grating, and wherein:

the first diffraction grating is a polarizing diffraction grating which transmits a linearly polarized light beam of wavelength $\lambda_1$ having a first polarization plane without diffracting and diffracts a linearly polarized light beam of wavelength $\lambda_2$ having a second diffraction plane perpendicular to the first diffraction plane and converts it to a tracking beam, the second diffraction grating is a polarizing diffraction grating which diffracts a linearly polarized light beam of wavelength $\lambda_1$ having the first diffraction plane and converts it to a tracking beam and transmits a linearly polarized light beam of wavelength $\lambda_2$ having the second polarization plane without diffracting.

Further, the present invention provides the double-wavelength light source unit according to the above-mentioned, wherein the first diffraction grating and the second diffraction grating constitute a double-wavelength-selection diffraction grating, and wherein:

the first diffraction grating comprises a grating material forming a concavo-convex shaped grating and a filler filling the concavo-convex portion of the grating material, wherein the refractive indices of the grating material and the filler are equal for an incident light beam of wavelength $\lambda_1$ so as to transmit the light beam without diffracting and the refractive indices of the grating material and the filler are different for an incident light beam of wavelength of $\lambda_2$ so as to diffract the light beam and convert it to a tracking beam, the second diffraction grating comprises a grating material forming a concavo-convex shaped grating and a filler filling the concavo-convex portion of the grating material, wherein the refractive indices of the grating material and the filler are equal for an incident light beam of a wavelength $\lambda_2$ so as to transmit the light beam without diffracting and the refractive indices of the grating material and the filler are different for an incident light beam of wavelength of $\lambda_1$ so as to diffract the light beam and convert it to a tracking beam.

Further, the present invention provides an optical head device which comprises the double-wavelength light source unit to be used in combination with at least an objective lens.

BRIEF DESCRIPTION OF THE DRAWINGS

FIG. 2 is a cross-sectional view showing an example of the double-wavelength selection diffraction grating of the present invention, wherein (a) shows a case where a light beam of wavelength $\lambda_1$ is incident, and (b) shows a case where a light beam of wavelength $\lambda_2$ is incident.

FIG. 4 is a side view schematically showing an optical head device employing the double-wavelength light source unit of the present invention.

BEST MODE FOR CARRYING OUT THE INVENTION

Figures 1A, 1B:
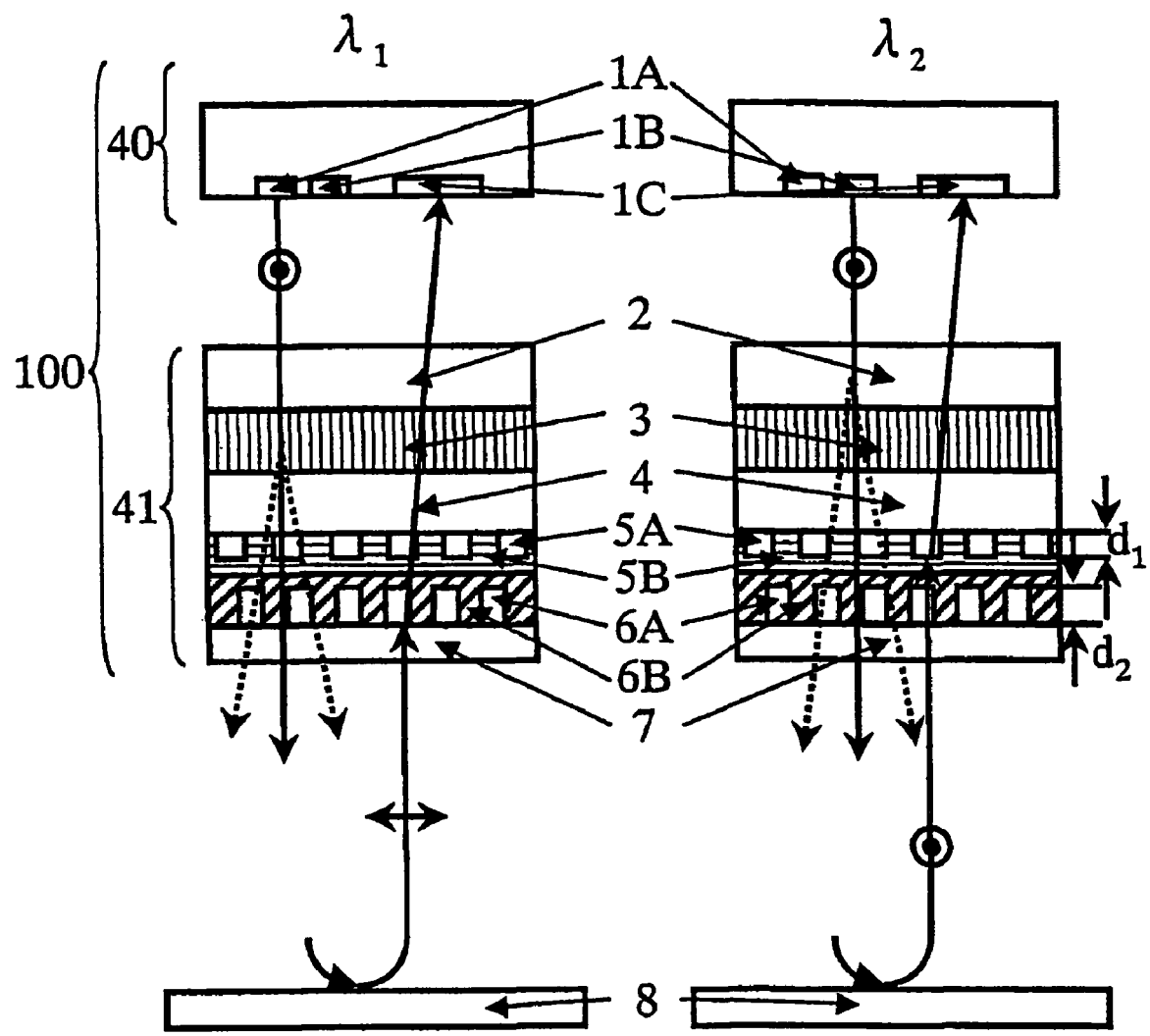
FIG. 1 is a cross-sectional view showing an example of the construction of the double-wavelength light source unit of the present invention, wherein (a) shows a case where a light beam of wavelength $\lambda_1$ is incident, and (b) shows a case where a light beam of wavelength $\lambda_2$ is incident.

The first Embodiment of the present invention concerns a double-wavelength light source unit. Some examples of the first Embodiment are described as follows.

The double-wavelength light source unit of the present invention comprises a double-wavelength light source emitting two light beams of different wavelengths from different emission points, a photodetector and a double-wavelength diffraction element transmitting two light beams of different wavelengths.

The double-wavelength light source means a light source emitting two light beams of different wavelengths, in which a double-wavelength laser diode is mainly used and the double-wavelength laser diode includes a monolithic type and a type in which two laser chips for different wavelength bands are bonded, and any one of these can be employed. Further, as the photodetector, a photo-receiving element such as a photodiode or a phototransistor can be employed.

The double-wavelength diffraction grating includes two types i.e. a diffraction grating generating a tracking beam and a diffraction grating generating a detection signal. Namely, the double-wavelength diffraction element comprises a first diffraction grating which transmits a light beam of either one of the two wavelengths emitted from the double-wavelength light source, without diffracting and diffracts at least a light beam having a polarization plane in a light beam of the other one of the wavelengths and converts it to a tracking beam, a second diffraction grating which diffracts at least a light beam having a polarization plane in a light beam of the one of the wavelengths and converts it to a tracking beam, and transmits a light beam of the other one of the wavelengths without diffracting, and a diffraction grating which diffracts only a detectable amount of at least a light beam of either one of the two wavelengths. The number of diffraction gratings for diffracting only a detectable amount may be one or two.

Namely, in the light source unit, the double-wavelength diffraction element may comprise three diffraction gratings in total, including a single diffraction grating generating a detection signal in addition to the first diffraction grating and the second diffraction grating generating track beams from the two light beams having different wavelengths, or may comprise four diffraction gratings in total including further two diffraction gratings for generating detection signals for the respective wavelengths, in addition to the first diffraction grating and the second diffraction grating.

In a case where the total three diffraction gratings are provided in the light source unit, the additional diffraction grating may, for example, be a concavo-convex type diffraction grating, a polarizing diffraction grating using a birefringent material or a wavelength-selection diffraction grating formed by combining materials having different refractive index-wavelength dispersions. In this case, the polarizing diffraction grating or the wavelength-selection diffraction grating may be outside of the light source unit and used in combination with the objective lens in the same manner. By making a construction in which the diffraction grating diffracting only a detectable amount of a light beam of one of the wavelengths is separated, it becomes possible to individually adjust each of the diffraction gratings to obtain a sufficient detection signal even in a case where error of emission points occurs in manufacturing the type of double-wavelength light source in which two laser chips having different wavelengths are bonded.

The double-wavelength diffraction element is assumed to be constituted by four diffraction gratings. Namely, they are the first diffraction grating which transmits a light beam of one of the two wavelengths emitted from the double-wavelength light source, without diffracting and diffracts at least a light beam having a polarization plane in a light beam of other one of the wavelengths and converts it to a tracking beam, the second diffraction grating which diffracts at least a light beam having a polarization plane in a light beam of the one of the wavelengths and converts it to a tracking beam and transmits a light beam of the other one of the wavelengths without diffracting, a third diffraction grating which transmits a light beam of the one of the wavelengths without diffracting and diffracts a detectable amount of at least a light beam having a polarization plane in a light beam of the other one of the wavelengths, and a fourth diffraction grating which transmits a light beam of any one of the two wavelengths having a first polarization plane without diffracting, diffracts a detectable amount of a light beam of the wavelength having a second polarization plane perpendicular to the first polarization plane, and transmits a light beam of the other one of the wavelengths having the first polarization plane without diffracting.

Further, when the light beam of the other one of the wavelengths has the second polarization plane, the fourth diffraction grating may transmit the light beam without diffracting or diffract a detectable amount of it.

Here, a light beam having a polarization plane means a light beam in which the polarization plane is not oriented in a specific direction, such as a randomly polarized light beam. Further, a light beam having a first polarization plane or the second polarization plane means a light beam in which the polarization plane is oriented in a specific direction. To convert it to a tracking beam means to generate a beam for tracking the surface of an optical recording medium, which includes a 3-beam conversion by splitting a light beam into three beams, or 5-beam conversion by splitting a light beam into five beams.

Further, it is preferred to dispose the first diffraction grating, the second diffraction grating, the third diffraction grating and the fourth diffraction grating in this order so that the fourth diffraction grating is at the side of an optical recording medium to reduce the diffraction pitches of the third and the fourth diffraction gratings. However, the first and the second diffraction gratings can be exchanged and the third and the fourth diffraction gratings may be exchanged. Further, the first and the third diffraction gratings may also be exchanged.

Further, the two light beams of different wavelengths are defined as a light beam of wavelength $\lambda_1$ and a light beam of wavelength $\lambda_2$ respectively. The double-wavelength light source unit of the present invention comprises the first diffraction grating which transmits a light beam of wavelength $\lambda_1$ without diffracting and diffracts a light beam of wavelength $\lambda_2$ and converts it to a tracking beam, the second diffraction grating which diffracts a light beam of wavelength $\lambda_1$ and converts it to a tracking beam and transmits a light beam of wavelength $\lambda_2$ without diffracting, the third diffraction grating which comprises a grating material forming a concavo-convex shaped grating and a filler filling the concavo-convex portion of the grating material, wherein the refractive indices of the grating material and the filler are equal for a light beam of wavelength $\lambda_1$ so as to transmit the light beam without diffracting and the refractive indices of the grating material and the filler are different for an incident light beam of wavelength of $\lambda_2$ so as to diffract a detectable amount of the light beam, and the fourth diffraction grating which transmits a linearly polarized light beam of wavelength $\lambda_1$ having a first polarization plane, diffracts a detectable amount of a linearly polarized light beam of wavelength $\lambda_1$ having a second polarization plane perpendicular to the first polarization plane, and transmits a linearly polarized light beam of wavelength $\lambda_2$ having the first polarization plane without diffracting.

The fourth diffraction grating can diffract a linearly polarized light beam of wavelength $\lambda_1$ reflected by the optical recording medium and converted to have the second polarization plane by the phase plate, toward the photodetector, when a phase plate for producing an odd number times of $\lambda_1/4$ is disposed between the optical recording medium and the unit.

By thus constituting the double-wavelength light source unit, a light beam of wavelength $\lambda_1$ can reach an optical recording medium without being diffracted for excess diffraction, which provides an effect that the utilization efficiency of light at a time of recording can be increased. Further, since the light beams of wavelengths $\lambda_1$ and $\lambda_2$ reach an optical recording medium without needless diffraction and light beams reflected by the optical recording medium are diffracted only by the third are the fourth diffraction gratings towards optical detectors so that unnecessary diffraction light does not incident into the photodetectors, there is an effect that a reproduction or recording of an information can be stably performed when this unit is employed in an optical head device.

Now, the present invention will be described with examples shown in the drawings. FIG. 1 is a cross-sectional view showing an example of the construction of the double-wavelength light source unit of the present invention, wherein (a) shows a case where a light beam of wavelength $\lambda_1$ is incident and (b) shows a case where a light beam of wavelength $\lambda_2$ is incident. The double-wavelength light source unit 100 comprises a double-wavelength selection diffraction grating 3, the third diffraction grating and the fourth diffraction grating integrated in a package not shown.

Here, a photo-receiving photo-emission element 40 comprises a laser diode 1A of $\lambda_1$=650 nm wavelength band, a laser diode 1B of $\lambda_2$=790 nm wavelength band and a photodetector 1C for receiving a signal light reflected by an optical disk 8. Further, the double-wavelength selection diffraction grating 3 is constituted by the first and the second diffraction gratings generating at least 0th diffraction light and ±1st diffraction light beams in which, for example, linear gratings are formed on transparent substrates 2 and 4.

The third diffraction grating is, for example, formed on a transparent substrate 4 and constructed so that the grating material forming a concavo-convex shape grating 5A and a filler 5B for filling the concavo-convex type grating 5A have an equal diffractive index for a light beam of wavelength $\lambda_1$ among signal lights reflected by an optical disk 8, so that the light beam is transmitted without being diffracted, and is constructed so that they have different refractive indices for a light beam of wavelength $\lambda_2$ so that the light beam of wavelength $\lambda_2$ reflected by the optical disk 8 is diffracted toward a photo-receiving plane of the photodetector, whereby the third diffraction grating functions as a beam splitter.

The fourth diffraction grating comprises, for example, a transparent substrate 7, a grating 6A made of a grating material of a birefringent medium formed on the transparent substrate 7 and a filler 6B for filling the grating 6A, which functions as a polarizing beam splitter which transmits a linearly polarized light beam of wavelength $\lambda_1$ having a first polarization plane and emitted from a laser diode 1A and a linearly polarized light beam of wavelength $\lambda_2$ having the first polarization plane emitted from a laser diode 1B without diffracting, and which diffracts a returned light beam converted to a linearly polarized light beam having a second polarization plane perpendicular to the first polarization plane, towards the photo-receiving plane of the photodetector.

By thus constructing the double-wavelength light source unit, miniaturization can be realized as compared with the case of using light source units for the respective wavelengths and position adjustment of the components in this unit can be omitted.

FIG. 1 shows a construction in which the double-wavelength selection diffraction grating, the third diffraction grating and the fourth diffraction grating are integrally formed. However, they may be individually formed as three diffraction gratings and then fixed in a package.

The third diffraction grating and the fourth diffraction grating will be described in more detail.

In the third diffraction grating, it is preferred that any one of the grating material of the concavo-convex type grating 5A formed on the surface of the transparent substrate 4, and the filler 5B filling at least concave portions of the grating 5A, contains a light-absorbing organic pigment. For example, an organic pigment contained in the grating material, can generate a large difference between the refractive index at wavelength $\lambda_1$ and the refractive index at wavelength $\lambda_2$ of the grating material by an abnormal dispersion effect. Namely, by appropriately selecting the materials of the grating 5A and the filler 5B, the refractive indices of the grating 5A and the filler 5B at wavelength $\lambda_1$ can be equalized, and at the same time, the difference in these refractive indices at wavelength $\lambda_2$ can be made large.

By using this method and by appropriately selecting the materials of the grating 5A and the filler 5B, for an incident light beam of wavelength $\lambda_1$, the incident light beam is transmitted without generating diffraction light since the refractive indices of both of these materials are equal. On the other hand, when an incident light beam of wavelength $\lambda_2$ is transmitted, 0th diffraction light and ±1st diffraction light beams are generated since the refractive indices of both of these materials are different.

Here, "refractive indices are equal at wavelength $\lambda_1$" means that they do not have to be numerically completely equal, and they may differ to the extent that a light beam of wavelength $\lambda_1$ is transmitted without diffraction of 0.5% or more of the incident light. Further, "the refractive indices are different at a light beam having a wavelength $\lambda_2$" means that the diffraction efficiency of ±1st diffraction light beams is at least 2%.

The fourth diffraction grating is made of a birefringent medium having an ordinary refractive index of $n_o$ and an extraordinary refractive index of $n_e$. For example, a grating 6A having a concavo-convex type in cross-section is formed on the surface of a transparent substrate 7, and a filler 6B having a homogeneous refractive index of $n_s$ fills at least concave portions of the grating 6A, and the fourth diffraction grating is laminated with the third diffraction grating having a concavo-convex type in cross-section.

Here, if, for example, the ordinary refractive index $n_o$ of the birefringent medium and the refractive index $n_s$ of the filler are made substantially equal, the fourth diffraction grating transmits an ordinarily polarized incident light without diffracting and can diffract an extraordinarily polarized incident light.

Further, a double-wavelength selection diffraction grating is constituted by the first diffraction grating and the second diffraction grating, and the first diffraction grating of the double-wavelength selection diffraction grating is a polarizing diffraction grating which transmits a linearly polarized light beam of wavelength $\lambda_1$ having a first polarization plane without diffracting, and diffracts a linearly polarized light beam of wavelength $\lambda_2$ having a second polarization plane perpendicular to the first polarization plane. Further, the second diffraction grating of the double-wavelength selection diffraction grating is a polarizing diffraction grating which diffracts a linearly polarized light beam of wavelength $\lambda_1$ having the first polarization plane and transmits a linearly polarized light beam of wavelength $\lambda_2$ having the second polarization plane without diffracting. The double-wavelength light source unit is preferably provided with such a double-wavelength selection diffraction grating. Now, an example of the first embodiment will be described with drawings.

FIG. 2 schematically shows a cross-sectional view of an example of the double-wavelength selection diffraction grating 3 in the double-wavelength light source unit of the present invention, wherein (a) shows a case where a light beam of wavelength $\lambda_1$ is incident, and (b) shows a case where a light beam of wavelength $\lambda_2$ is incident. On the transparent substrate 10, for example, an organic thin film having a phase-difference-generating function is laminated as a phase plate 12 with an adhesive 11. A first diffraction grating including a concavo-convex type grating 13A made of a birefringent medium having an ordinary refractive index $n_o$ and an extraordinary refractive index $n_e$ is formed on the surface of the transparent substrate 14, and a filler 13B having a refractive index $n_s$ substantially equal to the ordinary refractive index $n_o$ fills at least concave portions of the grating 13A, and the first diffraction grating is laminated on the phase plate 12.

A second diffraction grating comprising a concavo-convex type grating 15A made of a birefringent medium having an ordinary refractive index $n_o$ and an extraordinary refractive index $n_e$, is formed on a surface of the transparent substrate 14, opposite to the surface on which the first diffraction grating is formed. A filler 15B having a refractive index $n_s$ substantially equal to the ordinary refractive index $n_o$ fills at least concave portions of the grating 15A, and the second diffraction grating is laminated on an organic thin film having a phase-difference-generation function as a phase plate 16. Further, the phase plate 16 is laminated on a transparent substrate 18 with an adhesive 17.

Further, the phase plate 12 and the phase plate 16 have a function of generating a phase difference of an integer times for an incident light beam of wavelength $\lambda_2$ and generating a phase difference of half integer times for an incident light beam of wavelength $\lambda_1$, and they are disposed so that their fast axes are perpendicular to each other. By making their fast axes perpendicular to each other, there is an effect that the light beams of both of these wavelengths are output from the phase plate 16 with the same polarization planes as those incident in the phase plate 12.

Here, the diffraction grating 13A and the diffraction grating 15A are disposed so that extraordinary refractive index axis directions of birefringent media constituting the grating 13A and the grating 15A are, for example, perpendicular to each other and, for example, 45° to the fast axes of the phase plates 12 and 16. By thus disposing the angles between extraordinary refractive index axis directions and the fast axes, the polarization planes of each of the wavelengths and the refractive index axis directions forming the gratings become equal.

For example, the phase plate 12 and the phase plate 16 are made so as to give a phase difference of $5\lambda/2$ to a light beam of wavelength $\lambda_1$ and give a phase difference of substantially $2\lambda$ to an incident light beam of wavelength $\lambda_2$. Here, the reason of making the phase difference of $5\lambda/2$, is that since the thickness of the phase plate for the phase difference is made minimum, the dependency of the phase difference on incident angle and the dependency of the phase difference on wavelength become small. When linearly polarized light beams of wavelength $\lambda_1$ and wavelength $\lambda_2$ emitted from a double-wavelength light source constituted by laser diodes and having polarization planes parallel to each other, are transmitted through the phase plate 12, the light beam of wavelength $\lambda_1$ is output with its polarization plane rotated by 90° while the light beam of wavelength $\lambda_2$ is output with its polarization plane unchanged.

By the grating 13A in which the extraordinary refractive index axis direction of the birefringent medium is adjusted so that the polarization of a light beam of wavelength $\lambda_1$ becomes an ordinarily polarized light, a light beam of wavelength $\lambda_2$ becomes extraordinarily polarized light since its polarization plane is perpendicular to the polarization plane of a light beam of wavelength $\lambda_1$, and diffracted to generate 0th diffraction light and ±1st diffraction light beams, while an incident light beam of wavelength $\lambda_1$ is transmitted. Since the grating 15A and the grating 13A are made of birefringent medium having extraordinary refractive index axis directions perpendicular to each other, a polarized light beam of wavelength $\lambda_2$ becomes an ordinarily polarized light beam and transmitted while a light beam of wavelength $\lambda_1$ becomes an extraordinarily polarized light beam and is diffracted to generate 0th diffraction light and ±1st diffraction light beams. Since the fast axis of the phase plate 16 and the fast axis of the phase plate 12 are perpendicular to each other, light beams of wavelength $\lambda_1$ and wavelength $\lambda_2$ are output as linearly polarized light beams having the same polarization planes as those of incident light beams into the double-wavelength selection diffraction grating 42.

Further, the double-wavelength selection diffraction grating is constituted by laminating the first diffraction grating and the second diffraction grating. The first diffraction grating is composed of a grating material forming a concavo-convex shaped grating and a filler filling the concavo-convex portion of the grating material, the refractive indices of the grating material and the filler are equal for an incident light beam of wavelength $\lambda_1$ so as to transmit the light beam without diffracting, and the refractive indices of the grating material and the filler are different for an incident light beam of wavelength $\lambda_2$ so as to diffract this light beam. Further, the second diffraction grating is composed of a grating material forming a concavo-convex shaped grating and a filler filling the concavo-convex portion of the grating material, the refractive indices of the grating material and the filler are equal for an incident light beam of wavelength $\lambda_2$ so as to transmit the light beam without diffracting, and the refractive indices of the grating material and the filler are different for an incident light beam of wavelength $\lambda_1$ so as to diffract this light beam. It is preferred to make a double-wavelength light source unit provided with such a double-wavelength selection diffraction grating. Now, an example of the first embodiment is described with drawings.

Figures 3A, 3B:
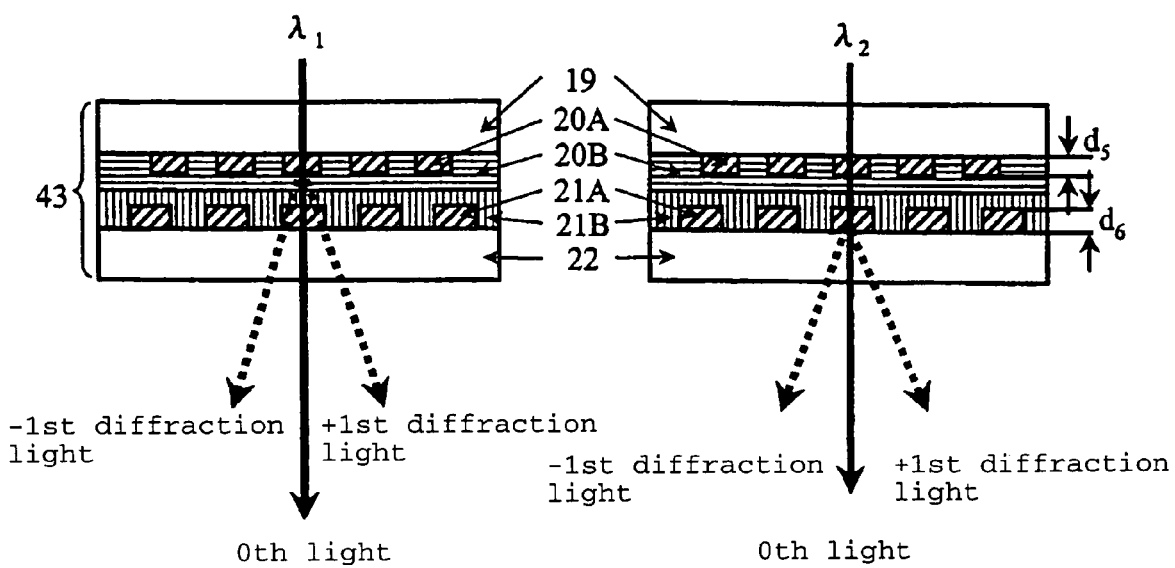
FIG. 3 is a cross-sectional view showing another example of the double-wavelength selection diffraction grating of the present invention, wherein (a) shows a case where a light beam of wavelength $\lambda_1$ is incident, and (b) shows a case where a light beam of wavelength $\lambda_2$ is incident.
Figure 5:
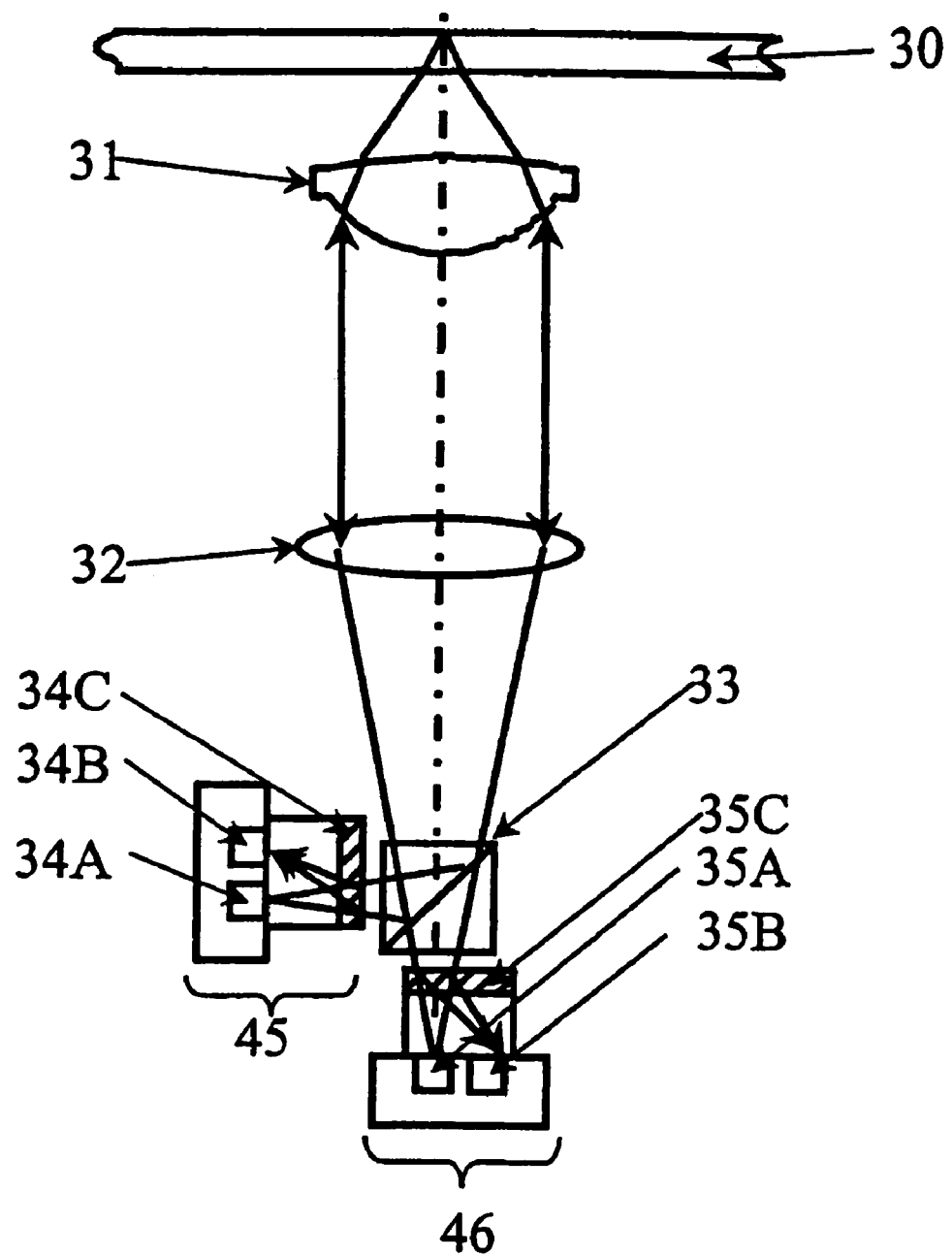
FIG. 5 is a side view schematically showing a conventional optical head device.

FIG. 3 schematically shows a cross-sectional view of another example of the double-wavelength selection diffraction grating in the double-wavelength light source unit of the present invention, wherein (a) shows a case where a light beam of wavelength $\lambda_1$ is incident and (b) shows a case where a light beam of wavelength $\lambda_2$ is incident. It is preferred that a transparent substrate 19 on which a first diffraction grating including a concavo-convex shaped grating 20A is formed, and a transparent substrate 22 on which a second diffraction grating including a concavo-convex shaped grating 21A is formed, are provided and at least concave portions of the gratings 20A and 21A are filled with a filler 20B and a filler 21B respectively, and the first diffraction grating and the second diffraction grating are laminated. By thus constructing, there is an effect that the unit can be miniaturized. Further, in the same manner as the third diffraction grating, any one of the material forming the grating 20A or the material of the filler 20B and any one of the material forming the grating 21A or the material of the filler 21B preferably contain a light-absorbing organic pigment.

For example, grating materials of the grating 20A and the grating 21A are assumed to contain an organic pigment. An incident light beam of wavelength $\lambda_1$ is transmitted without being diffracted since the refractive indices of the grating material forming the grating 20A and the filler 20B are substantially equal for the wavelength, and an incident light beam of wavelength $\lambda_2$ is diffracted to generate 0th diffraction light and ±1st diffraction light beams since the refractive indices of the grating material forming the grating 20A and the filler 20B are different for the wavelength $\lambda_2$. Further, the incident light beam of wavelength $\lambda_1$ is diffracted to generate 0th diffraction light and ±1st diffraction light beams since the refractive indices of the grating material forming the grating 21A and the filler 21B are different at the wavelength $\lambda_1$, and the incident light of wavelength $\lambda_2$ is transmitted without being diffracted since the refractive indices of the grating material forming the grating 21A and the filler 21B are made substantially equal at the wavelength $\lambda_2$.

Further, it is preferred that a phase plate producing a phase difference of an odd number times of $\lambda_1/4$ for an incident light beam of wavelength $\lambda_1$ is integrally formed at the light-output side of the double-wavelength diffraction grating in the double-wavelength light source unit.

In FIG. 1, it is preferred to constitute a double-wavelength light source unit in which a phase plate providing a phase difference of an odd number times of $\lambda/4$ for an incident light beam of wavelength $\lambda_1$ is integrally formed at the light-output side of the double-wavelength diffraction element, for the purpose of omitting adjustment of components and reducing the total wavefront aberration. An odd number times includes 1 time, 3 times, 5 times and 7 times, and is preferably 5 times since such a phase plate provides a phase difference of an integer times of $\lambda_2$ for an incident light beam of wavelength $\lambda_2$. Here, an integer times includes 1 time, 2 times and 3 times. 1 time is preferred since the dependency of the phase difference on incident angle or on wavelength is small (not shown).

The optical head device as the second embodiment of the present invention will be described.

It is preferred to construct an optical head device which comprises the above-mentioned double-wavelength light source unit and used in combination with at least an objective lens, for the reason that a stable recording or reproduction can be performed since unnecessary diffraction light is not generated, and recording of good efficiency can be performed since the utilization efficiency of light is high.

FIG. 4 is a side view showing an example of an optical head device including the double-wavelength light source unit 44 of the present invention. The double-wavelength light source unit 44 is constituted by integrating a double-wavelength laser diode 29AB as a double-wavelength light source, a phase plate 26 providing a phase difference of an odd number times of $\lambda/4$ for an incident light beam of wavelength $\lambda_1$ among two light beams of wavelength $\lambda_1$ and wavelength $\lambda_2$ emitted from the double-wavelength laser diode 29AB and providing a phase difference of an integer times of $\lambda_2$ for a light beam of wavelength $\lambda_2$, a double-wavelength selection diffraction grating 28 constituted by a first and a second diffraction gratings as diffraction gratings for generating 3 beams for detecting a tracking error signal of CD type and of DVD type, a double-wavelength selection diffraction beam splitter 27 constituted by a third diffraction grating and a fourth diffraction grating functioning as holographic beam splitters converging signal light reflected by an optical disk 23 to a photodetector 29C, and the photodetector 29C for detecting the signal light reflected by the optical disk. Here, the double-wavelength laser diode 29AB emits light beams of a $\lambda_1$=650 nm wavelength band for DVD and of a $\lambda_2$=790 nm wavelength band for CD.

The optical head device is constituted by the double-wavelength laser light source unit 44, a collimator lens 25 and an objective lens 24. A light beam of wavelength $\lambda_1$ emitted from the double-wavelength laser diode 29AB is incident into the double-wavelength selection diffraction grating 28 and from 5% to 10% of the incident light is diffracted as ±1st order light beams. The light beam of wavelength $\lambda_1$ is further transmitted through the double-wavelength selection diffraction beam splitter 27 and converted to be a circularly polarized light beam by a $\lambda/4$ plate as the phase plate 26, converted to be a parallel light beam by a collimator lens 25 and converged on an information recording plane of an optical disk 23 of DVD type by an objective lens 24. The light beam reflected by the information recording plane is again transmitted through the objective lens 24 and the collimator lens 25, converted to a linearly polarized light beam having a polarization plane perpendicular to that at the time of emission by the phase plate 26, diffracted by the double-wavelength selection diffraction beam splitter 27 and converged on a photo-receiving plane of the photodetector 29C.

On the other hand, a light beam of wavelength $\lambda_2$ emitted from the double-wavelength laser diode 29AB, is incident into the double-wavelength selection diffraction grating 28 and from 5 to 20% of the incident light beam is diffracted as ±1st order light beams. The light beam of wavelength $\lambda_2$ is further transmitted through the double-wavelength selection diffraction beam splitter 27, converted to a linearly polarized light beam by the phase plate 26, converted to a parallel light by the collimator lens 25 and converged on an information recording track of an information recording plane of a CD type optical disk 23 by an objective lens 24 as three beams corresponding to 0th diffraction light and ±1st diffraction light generated by the double-wavelength selection diffraction grating. A light beam reflected by the information recording plane is transmitted again through the objective lens 24 and the collimator lens 25, converted into a linearly polarized light having a polarization plane in parallel with that at the time of emission by the phase plate 26, and diffracted by the double-wavelength selection diffraction beam splitter 27 to be converged on a photo-receiving plane of the photodetector 29C.

Here, the light beam of wavelength $\lambda_2$ is diffracted also on the way toward the optical disk by the third diffraction grating of the double-wavelength selection beam splitter 27 to generate diffraction light. However, by determining the grating pitch so as not to enter the diffraction light into the effective area of the collimator lens 25, it is possible to prevent the diffraction light from being converged on the optical disk to be stray light.

Thus, in the case of an optical head device including the double-wavelength light source unit of the present invention, in a DVD system using a light beam of wavelength $\lambda_1$, detection of focus signal and detection of pit signal from an information recording plane of an optical disk are performed by an astigmatism method employing the photodetector 29C which is divided into a plurality of photo-receiving portions. A differential push-pull method of detecting ±1st diffraction light beams as a tracking error signals with the photodetector 29C is applied.

On the other hand, in a CD system using a light beam of wavelength $\lambda_2$, detection of focus signal and detection of pit signal from an information recording plane of an optical disk is performed by an astigmatism method employing the photodetector 29C which is divided into the same number of photo-receiving portions as those of the DVD system. A 3-Beam method of detecting ±1st diffraction light beams as tracking error signals with the photodetector 29C is applied.

Further, an organic thin film having a phase-difference-generation function, for example, a birefringent medium such as polycarbonate in which the optical axis is uniform, is employed as the phase plate 26. As a result, since the change of phase difference by the difference of incident angle of incident light beam is small as compared with a conventional quartz phase plate, even in a construction that the phase plate is disposed in the vicinity of the double-wavelength light source in which the diffraction light is incident into the double-wavelength diffraction element, a constant and uniform phase difference can be generated.

In the first double-wavelength selection diffraction grating 42 (FIG. 2), since it becomes a polarizing diffraction grating functioning only for one of the wavelengths by making the polarization planes of an incident light beam of $\lambda_1$ and an incident light beam of wavelength $\lambda_2$ in parallel with each other, there is a flexibility of adjusting the efficiency ratio between 0th diffraction light and ±1st diffraction light depending on the purpose by changing the grating depth of the birefringent medium. In particular, this feature is effective for an optical head device for recording in which the transmittance of 0th diffraction light is preferably set at least 70%. Further, the phase plate 12 can be omitted by making the polarization planes of linearly polarized light beams emitted from the laser diodes 1A and 1B in the photo-receiving emission element 40 (FIG. 1) perpendicular to each other.

In the second double-wavelength selection diffraction grating 43 (FIG. 3), two phase plates and one transparent substrate can be omitted as compared with the first double-wavelength selection diffraction grating, and the intensity of diffracted light does not depend on the polarization direction of the linearly polarized incident light beam. Therefore, the second double-wavelength selection diffraction grating 43 has the flexibility that there is no restriction in the position to dispose the double-wavelength selection diffraction grating and the flexibility that the efficiency ratio of the first double-wavelength selection diffraction grating between 0th diffraction light and ±1st diffraction light can be adjusted depending on purposes.

FIG. 4 shows an example of phase plate 26 having a construction that a birefringent film of polycarbonate is bonded to a glass substrate with an adhesive. However, an organic thin film having a phase-difference-generation function may be directly formed on a glass substrate.

Specifically, a coating liquid for alignment film is coated on a glass substrate to form an alignment film, the film is subjected to a desired alignment treatment and then, a polymeric liquid crystal as a birefringent medium is coated on the film, whereby the optical axis direction of the polymeric liquid crystal is aligned in the alignment direction of the alignment film. Further, a photopolymerization curing agent is contained in the polymeric liquid crystal in advance, and the polymeric liquid crystal is irradiated with light from a light source for photopolymerization to be cured, whereby a phase plate can be obtained without using adhesive agent.

As already partially explained in the above, for the grating made of birefringent medium, a polymeric liquid crystal or an organic film having birefringency by stretching can be employed. As the filler, an adhesive of e.g. acryl type or epoxy type can be employed. The transparent substrate on which a grating is formed may, for example, be a glass substrate or plastic substrate, and from the viewpoint of e.g. durability, a glass substrate is preferably employed.

The organic pigment to be contained in the grating material or the filler, may, for example, be a pigment of piropropyrol type, azo type or phthalocyanine type.

The construction of the double-wavelength light source unit employing the first and the second double-wavelength selection diffraction gratings will be specifically described in the following Examples.

Examples will be described as follows.

EXAMPLE 1

With respect to the double-wavelength light source unit of the present invention, the first diffraction grating, the second diffraction grating, the third diffraction grating and the fourth diffraction grating will be described in this order.

At first, a case where the first double-wavelength selection diffraction grating is employed will be described employing FIG. 1 and FIG. 2.

As shown in FIG. 2, for the first double-wavelength selection diffraction grating, a phase plate 12 was laminated on a glass substrate employed as a transparent substrate 10 with an acryl type adhesive agent employed as an adhesive 11. A polycarbonate film was employed as a phase plate 12 which is a birefringent organic thin film in which optical axis is uniformly in a stretching direction and which produces a phase difference of $5\lambda/2$ at a wavelength $\lambda_1=650$ nm. The fast axis of the phase plate 12 was adjusted to be at 45° to the polarization planes of emission light beams of wavelength $\lambda_1$ and wavelength $\lambda_2$ emitted from a double-wavelength laser diode employed as the double-wavelength light source and having polarization planes parallel with each other.

When a polycarbonate film producing a phase difference of $5\lambda/2$ at a wavelength $\lambda_1=650$ nm, is employed as the phase plate 12, since the phase plate 12 provides a phase difference of substantially twice of λ at a wavelength $\lambda_2=790$ nm, a light beam of wavelength $\lambda_1$ transmitted through the phase plate 12 is output as a substantially linearly polarized light beam whose polarization plane is perpendicular to that as incident, while the polarization plane of an incident light beam of wavelength $\lambda_2$ is unchanged. Further, since the polycarbonate film itself employed as the phase plate 12 is a thin film having a thickness of from 20 μm to 80 μm and the film thickness distribution is not uniform, the variation of transmitted wavefront aberration was large when it was employed alone.

A first diffraction grating including a grating 13A made of a polymeric liquid crystal as a birefringent medium having an ordinary refractive index of $n_o=1.5$ and an extraordinary refractive index of $n_e=1.65$, was formed on the surface of a glass substrate employed as a transparent substrate 14, and they were laminated on the phase plate 12 with an acryl type adhesive employed as a filler 13B having a refractive index of $n_s$ substantially equal to the ordinary refractive index $n_o$.

Provided that the grating depth of the grating 13A of the first diffraction grating is designated as $d_3$, since there is no difference between the refractive indices of the grating material and the filler for an ordinarily polarized incident light beam of wavelength $\lambda_1$, no phase difference is generated and the light beam is straightly transmitted without being diffracted. On the other hand, for an extraordinarily polarized incident light of wavelength $\lambda_2$, a phase difference of $2\Pi \times (n_e-n_s) \times d_3/\lambda$ is generated and diffraction light is generated.

Therefore, by adjusting the direction of extraordinary refractive index axis of the grating material so that an incident polarized light beam of wavelength $\lambda_1=650$ nm for DVD system corresponded to an ordinary light and an incident polarized light beam of wavelength $\lambda_2=790$ nm for CD system corresponded to an extraordinary light for the first diffraction grating including the grating 13A, a polarizing diffraction grating which transmitted an incident polarized light beam of wavelength $\lambda_1$ without diffracting and generated diffraction light of an incident polarized light beam of wavelength $\lambda_2$, was obtained.

By making the grating depth $d_3$ of the grating 13A of the first diffraction grating 0.92 μm a first diffraction grating which transmitted an incident light beam of wavelength $\lambda_1$=650 nm and had about 70% of transmittance for 0th diffraction light and about 10% of diffraction efficiency for ±1st diffraction light of an incident light beam of wavelength $\lambda_2$=790 nm, was achieved.

On the surface of the transparent substrate 14 opposite to the surface on which the grating 13A was present, a second diffraction grating including a grating 15A made of the same birefringent medium as the grating material of the grating 13A and having an extraordinary refractive index axis direction perpendicular to the extraordinary refractive index axis direction of the grating material of the grating 13A, namely made of a high molecular liquid-crystal was formed. Then, they were laminated on an organic thin film having a phase-difference-generation function employed as a phase plate 16 with a filler 15B having a refractive index $n_s$ substantially equal to the ordinary refractive index $n_o$. Further, the phase plate 16 was laminated on a glass substrate employed as a transparent substrate 18 with an adhesive agent 17.

When the grating depth of the grating 15A of the second diffraction grating is $d_4$, there is no difference between the refractive indices of the grating material and the filler for an ordinarily polarized incident light beam of wavelength $\lambda_2$, and accordingly, the light beam is straightly transmitted without being diffracted. On the other hand, there is a phase difference of $2\Pi\times(n_e-n_s)\times d_4/\lambda$ for an extraordinarily polarized incident light beam of wavelength $\lambda_1$, and the light beam is diffracted to generate diffraction light.

Therefore, for the second diffraction grating, a polarized incident light beam of wavelength $\lambda_1$=650 nm for DVD system corresponds to an extraordinary light beam and a polarized light beam of wavelength $\lambda_2$=790 nm for CD system corresponds to an ordinary light beam. Accordingly, an incident light beam of wavelength $\lambda_2$ is transmitted without being diffracted while an incident light beam of wavelength $\lambda_1$ is diffracted to generate diffraction light.

By making the grating depth $d_4$ of the grating 15A of the second diffraction grating 0.6 μm, a second diffraction grating which has a transmittance of about 80% for 0th diffraction light and a diffraction efficiency of about 7% for ±1st diffraction light for an incident light beam of wavelength $\lambda_1$=650 nm, was achieved.

As the phase plate 16, a birefringent organic thin film with the optical axis being uniformly in a stretching direction obtained by stretching a polycarbonate film, was employed in the same manner as the phase plate 12. The fast axis of the phase plate 16 which generates a phase difference of an integer times for an incident light beam of wavelength $\lambda_2$ and generates a phase difference of half integer times for an incident light beam of wavelength $\lambda_1$, is adjusted to be at an angle of 45° to polarization planes of incident light beams of wavelength $\lambda_1$ and wavelength $\lambda_2$ having polarization planes perpendicular to each other. In this case, a linearly polarized light beam of $\lambda_1$ incident into the phase plate 12 is output as a substantially linearly polarized light beam having a polarization plane perpendicular to the polarization plane as incident, while a linearly polarized incident light beam of wavelength $\lambda_2$ is output as a substantially linearly polarized light beam having a polarization plane in parallel with the polarization plane as incident, whereby the linearly polarized light beam of wavelength $\lambda_2$ is output with the same polarization plane as that of the incident light beam into the double-wavelength selection diffraction grating 42.

Use of a polycarbonate film, as the phase plate 16, providing a phase difference of 5λ/2 for a light beam of wavelength $\lambda_1$=650 nm in the same manner as phase plate 12, provides a phase difference of twice as large as $\lambda_2$ for a light beam of wavelength $\lambda_2$=790 nm, whereby a light beam of wavelength $\lambda_1$ transmitted through the phase plate 16 is output as substantially polarized light beam having a polarization plane perpendicular to the polarization plane as incident, while the polarization plane of the light beam of wavelength $\lambda_2$ is unchanged.

As shown in FIG. 1, the third diffraction grating diffracting an incident light beam of wavelength $\lambda_2$ includes a grating 5A made of a color resist having a refractive index $n_1$=1.7 at a wavelength $\lambda_1$ and a refractive index $n_2$=1.66 at a wavelength $\lambda_2$ and containing a pigment red 254 as a red organic pigment, and formed on a glass substrate employed as a transparent substrate 4. The concave portions of the third diffraction grating are filled with a filler 5B made of high-refractive index organic material as a homogeneous refractive index material of $n_s$=1.7.

Provided that the grating depth of the grating 5A of the third diffraction grating is $d_1$, since the refractive indices of the grating 5A and the filler 5B are substantially equal (1.7) for an incident light beam of wavelength $\lambda_1$, the light beam is straightly transmitted without being diffracted. On the other hand, since the phase difference becomes $2\Pi\times(n_2-n_s)\times d_1/\lambda_2$ for an incident light beam of wavelength $\lambda_2$, the light beam is diffracted to generate diffraction light.

By making the grating depth of the grating 5A 3.8 μm, a third diffraction grating was achieved which transmitted an incident light beam of wavelength $\lambda_1$=650 nm and had a transmittance of about 78% for 0th diffraction light and a diffraction efficiency of about 8% for ±1st diffraction light of an incident light beam of $\lambda_2$=790 nm.

On the surface of a glass substrate as a transparent substrate 7, a polymeric liquid crystal as a birefringent medium having a ordinary refractive index axis direction equal to polarization directions of incident light beams of wavelength $\lambda_1$=650 nm and wavelength $\lambda_2$=790 nm and having an ordinary refractive index $n_o$=1.5 and an extraordinary refractive index $n_e$=1.65 for a light beam of wavelength $\lambda_1$=650 nm, is processed to form a grating 6A as a concavo-convex type polarizing diffraction grating, and the concave portions are filled with an acryl type adhesive agent as a filler 6B having a homogeneous refractive index $n_s$ substantially equal to the ordinary refractive index $n_o$ of the birefringent medium.

Provided that the grating depth of the grating 6A is $d_2$, since the refractive indices of the grating material and the filler 6B are substantially equal for an ordinarily polarized incident light beams of wavelength $\lambda_1$=650 nm and wavelength $\lambda_2$=790 nm, the light beams are transmitted without being diffracted. On the other hand, for an extraordinarily polarized incident light beam of wavelength λ, a phase difference of $2\Pi\times(n_e-n_s)\times d_2/\lambda$ is generated and the light beam is diffracted.

Therefore, since the polarized light beams of wavelength $\lambda_1$=650 nm for DVD system and wavelength $\lambda_2$=790 nm for CD system emitted from the double-wavelength light source were ordinary light beams for the birefringent medium of the fourth diffraction grating including the grating 6A, no diffraction was occurred to these light beams. Further, by a phase plate of polycarbonate film providing a phase difference of 5λ/4 for wavelength $\lambda_1$=650 nm disposed between an optical disk and the light source unit, a polarized light beam of wavelength $\lambda_1$=650 nm for DVD system reflected by the optical disk was converted to be an extraordinary light beam for the birefringent medium forming the fourth diffraction grating. Further, by the phase plate of polycarbonate film, a polarized light beam of wavelength $\lambda_2$=790 nm for CD system was converted to an ordinary light beam for the birefringent medium forming the fourth diffraction grating. By this construction, a wavelength-selection diffraction beam splitter which does not diffract light beams of wavelength $\lambda_1$=650 nm and wavelength $\lambda_2$=790 nm on the way to the optical disk and diffracts only the light beam of wavelength $\lambda_1$=650 nm on the way back from the optical disk, was obtained.

By making the grating depth $d_2$ of the grating 6A of the fourth diffraction grating 2.2 μm, a wavelength-selection diffraction beam splitter which has a transmittance of about 0% for 0th diffraction light and a diffraction efficiency of 38% for ±1st diffraction light of an incident light beam of wavelength $\lambda_1$=650 nm, was achieved.

In this Example, since the filler is sandwiched and bonded between glass substrates excellent in thickness accuracy and flatness and unlikely to be deformed, transmitted wavefront aberration of light emitted from the double-wavelength light source unit becomes stable and small value.

Specifically, for light beams of wavelength $\lambda_1$ and wavelength $\lambda_2$, root mean square value of wavefront aberration became at most 0.03 λ.

A double-wavelength light source unit was produced by integrating a photo-receiving emission element 40 comprising a laser diode 1A of wavelength $\lambda_1$=650 nm, a laser diode 1B of wavelength $\lambda_2$=790 nm and a photo-diode 1C, and a double-wavelength diffraction element 41 formed by laminating from the first diffraction grating to the fourth diffraction grating, with employing a plastic cap not shown.

EXAMPLE 2

The second double-wavelength selection diffraction grating of the double-wavelength light source unit of the present invention will be described with reference to FIG. 3.

On a glass substrate as a transparent substrate 19, in the same manner as the grating 5A of Example 1, a first diffraction grating including a grating 20A made of a color resist having a refractive index of $n_1$=1.7 at a wavelength $\lambda_1$ and a refractive index $n_2$=1.66 at a wavelength $\lambda_2$ containing a pigment red 254 as a red organic pigment, was formed and the concave portions were filled with a filler 20B made of high-refractive index organic material, as a homogeneous refractive index material of $n_s$=1.7.

Provided that the grating depth of the grating 20A of the first diffraction grating is $d_5$, since the refractive indices of the grating 20A and the filler 20B are substantially equal (n=1.7) for an incident light beam of wavelength $\lambda_1$, the light beam is transmitted without being diffracted. On the other hand, since the phase difference becomes $2\Pi \times (n_2-n_s) \times d_5/\lambda_2$ for an incident light beam of wavelength $\lambda_2$, the light beam is diffracted to generate diffraction light.

By making the depth $d_5$ of the grating 20A 3.2 μm, the transmittance of 0th diffraction light was 80% and the diffraction efficiency of each of ±1st diffraction light beams was 5% for an incident light beam of $\lambda_2$=790 nm. Further, a first diffraction grating was achieved in which the transmittance of 0th diffraction light was 95% and the diffraction efficiency of ±1st diffraction light beams and higher order diffraction light beams were each at most 0.5% for an incident light beam of wavelength $\lambda_1$=650 nm.

Then, on a glass substrate as a transparent substrate 22, a second diffraction grating including a grating 21A made of a color resist having a refractive index $n_1$=1.74 at a wavelength $\lambda_1$ and a refractive index $n_2$=1.7 at a wavelength $\lambda_2$ containing a pigment red 254 as a red organic pigment more than that contained in the above grating 5A or the grating 20A, was formed and the concave portions were filled with a filler 21B made of a high-refractive index organic material as a homogeneous refractive index material of $n_s$=1.7.

Provided that the grating depth of the grating 21A of the second diffraction grating is $d_6$, since the refractive indices of the grating 21A and the filler 21B are substantially equal for an incident light beam of wavelength $\lambda_2$, the light beam is transmitted without being diffracted. On the other hand, since the phase difference becomes $2\Pi \times (n_1-n_s) \times d_6/\lambda_1$ for an incident light beam of wavelength $\lambda_1$, the light beam is diffracted to generate diffraction light.

By making the depth $d_6$ of the grating 21A 2.6 μm, the transmittance of 0th diffraction light was 78% and the diffraction efficiency of each of ±1st diffraction light beams was 6% for an incident light beam of $\lambda_1$=650 nm. Further, a second diffraction grating was achieved in which for an incident light beam of wavelength $\lambda_1$=650 nm, the transparency of the 0th diffraction light was 95%, and the diffraction efficiency for +1st diffraction light, −1st diffraction light and each of higher-order diffraction light are all at most 0.5%.

A double-wavelength diffraction element 41 was produced by laminating on the first diffraction grating and the second diffraction grating thus prepared, on the third diffraction grating and the fourth diffraction grating prepared in the same manner as in Example 1. In the same manner as in Example 1, on a photo-receiving emission element 40 in which a laser diode 1A of wavelength $\lambda_1$=650 nm, a laser diode 1B of wavelength $\lambda_2$=790 nm and a photodiode 1C were formed, a double-wavelength diffraction element 41 was integrally formed with employing a plastic cap not shown to build a double-wavelength light source unit.

INDUSTRIAL APPLICABILITY

As described above, by employing the double-wavelength light source unit of the present invention, an optical element having a diffraction grating function for generating three beams from a light beam of specific wavelength, and a function of converging a signal light reflected by an optical disk on e.g. a photodetector, without deteriorating a wavefront aberration, is achieved.

Further, in an optical head device employing the double-wavelength light source unit of the present invention, reduction of the number of components of the device and miniaturization can be realized by employing a double-wavelength laser, and at times of recording or reproducing of an information in an optical disk of CD type and an optical disk of DVD type, stable recording and reproducing performance with high light-utilization efficiency can be realized.

The entire disclosure of Japanese Patent Application No. 2002-329724 filed on Nov. 13, 2002 including specification, claims, drawings and summary is incorporated herein by reference in its entirety.

What is claimed is:

1. A double-wavelength light source unit including a double-wavelength light source emitting two light beams of linearly polarized light of different wavelengths $\lambda_1$ and $\lambda_2$ from different emission points, a photo detector and a double-wavelength diffraction element for transmitting the two light beams of different wavelengths, the double-wavelength diffraction element comprising:

a first diffraction grating including a grating material forming a concavo-convex shaped grating and a filler filling the concavo-convex portion of the grating material, the refractive indices of the grating material and the filler of the first diffraction grating are equal for the incident light beam of wavelength $\lambda_1$ so as to transmit the light beam without diffracting and the refractive indices of the grating material and the filler of the first diffraction grating are different for the incident light beam of wavelength $\lambda_2$ so as to diffract the light beam to generate at least $0^{th}$ and $\pm 1^{st}$ order diffraction light beams as the tracking beams;

a second diffraction grating including a grating material forming a concavo-convex shaped grating and a filler filling the concavo-convex portion of the grating material, and the refractive indices of the grating material and the filler of the second diffraction grating are equal for the incident light beam of wavelength $\lambda_2$, so as to transmit the light beam without diffracting and the refractive indices of the grating material and the filler of the second diffraction grating are different for the incident light beam of wavelength $\lambda_1$ so as to diffract the light beam to generate at least $0^{th}$ and $\pm 1^{st}$ order diffraction light beams as the tracking beams;

a third diffraction grating including a grating material forming a concavo-convex shaped grating and a filler filling the concavo-convex portion of the grating material, wherein the refractive indices of the grating material and the filler for the light beam of wavelength $\lambda_1$ are equal so as to transmit the light beam without diffracting and the refractive indices of the grating material and the filler are different for the light beam of wavelength of $\lambda_2$ so as to diffract an amount of the light beam of wavelength $\lambda_2$ detectable by the photo detector; and a fourth diffraction grating configured to transmit without diffraction a linearly polarized light beam of wavelength $\lambda_1$ having a first polarization plane, to diffract an amount of a linearly polarized light beam of wavelength $\lambda_1$ detectable by the photo detector and having a second polarization plane perpendicular to the first polarization plane, and to transmit without diffraction a linearly polarized light beam of wavelength $\lambda_2$ having the first polarization plane.

2. The double-wavelength light source unit according to claim 1, wherein a light-output side of the double-wavelength diffraction element is provided with a phase plate configured to generate a phase difference of an odd number times of $\lambda_1/4$ for the light beam of wavelength $\lambda_1$.

3. The double-wavelength light source unit according to claim 1, further comprising an objective lens.

4. The double-wavelength light source unit according to claim 2, wherein the phase plate generates a phase difference of an integer multiple of $\lambda_2$ for the light beam of wavelength $\lambda_2$.

5. A double-wavelength light source unit including a double-wavelength light source emitting two light beams of linearly polarized light of different wavelengths $\lambda_1$ and $\lambda_2$ from different emission points, a photo detector and a double-wavelength diffraction element for transmitting the two light beams of different wavelengths, the double-wavelength diffraction element comprising:

a first diffraction grating including a birefringent grating material forming a concavo-convex shaped grating and a filler filling the concavo-convex portion of the grating material, wherein an ordinary refractive index $n_0$ of the birefringent grating material is substantially equal to a refractive index $n_s$ of the filler, and an extraordinary refractive index direction of the birefringent grating material is configured so that the first diffraction grating transmits the linearly polarized light beam of wavelength $\lambda_1$ having a first polarization plane as an ordinarily polarized light beam without diffraction, and the first diffraction grating diffracts the linearly polarized light beam of wavelength $\lambda_2$ having a second polarization plane perpendicular to the first polarization plane as an extraordinary polarized light beam and generates at least $0^{th}$ and $\pm 1^{st}$ order diffraction light beams to be used as tracking beams;

a second diffraction grating including a birefringent grating material forming a concavo-convex shaped grating and a filler filing the concavo-convex portion of the grating material, wherein an ordinary refractive index $n^0$ of the birefringent grating material is substantially equal to a refractive index $n_0$ of the filler, and an extraordinary refractive index direction of the birefringent grating material is configured to be perpendicular to the extraordinary refractive index direction of the birefringent grating material of the first diffraction grating, so that the second diffraction grating transmits a linearly polarized light beam of wavelength $\lambda_2$ having the second polarization plane as an extraordinarily polarized light beam without diffraction, and the second diffraction grating diffracts the linearly polarized light beam of wavelength $\lambda_1$ having the first polarization plane as an ordinarily polarized light beam and generates at least $0^{th}$ and $\pm 1^{st}$ order diffraction light beams to be used as tracking beams;

a third diffraction grating including a grating material forming a concavo-convex shaped grating and a filler filling the concavo-convex portion of the grating material, wherein the refractive indices of the grating material and the filler for the light beam of wavelength $\lambda_1$ are equal so as to transmit the light beam without diffracting and the refractive indices of the grating material and the filler are different for the light beam of wavelength $\lambda_2$ so as to diffract an amount of the light beam of wavelength $\lambda_2$ detectable by the photo detector; and a fourth diffraction grating configured to transmit without diffraction the linearly polarized light beam of wavelength $\lambda_1$ having a first polarization plane, to diffract an amount of linearly polarized light beam of wavelength $\lambda_1$ detectable by the photo detector and having a second polarization plane perpendicular to the first polarization plane, and to transmit without diffraction a linearly polarized light beam of wavelength $\lambda_2$ having a first polarization plane.

6. A double-wavelength light source unit including a double-wavelength light source emitting two light beams of linearly polarized light of different wavelengths $\lambda_1$ and $\lambda_2$ from different emission points, a photo detector and a double-wavelength diffraction element for transmitting the two light beams of different wavelengths, the double-wavelength diffraction element comprising:

a first diffraction grating including a birefringent grating material forming a concavo-convex shaped grating and a filler filling the concavo-convex portion of the grating material, wherein an ordinary refractive index $n_0$ of the birefringent grating material is substantially equal to a refractive index $n_s$ of the filler, and an extraordinary refractive index direction of the birefringent grating material is configured so that the first diffraction grating transmits the linearly polarized light beam of wavelength $\lambda_1$ having a first polarization plane as ordinarily polarized light beam without diffraction, and the first diffraction grating diffracts the linearly polarized light beam of wavelength $\lambda_2$ having a second polarization plane perpendicular to the first polarization plane as an extraordinary polarized light beam and generates at least $0^{th}$ and $\pm 1^{st}$ order diffraction light beams to be used as tracking beams;

a second diffraction grating including a birefringent grating material forming a concavo-convex shaped grating and a filler filing the concavo-convex portion of the grating material, wherein an ordinary refractive index $n_0$ of the birefringent grating material is substantially equal to a refractive index $n_s$ of the filler, and an extraordinary refractive index direction of the birefringent grating material is configured to be perpendicular to the extraordinary refractive index direction of the birefringent grating material of the first diffraction grating, so that the second diffraction grating transmits the linearly polarized light beam of wavelength $\lambda_2$ having the second polarization plane as an extraordinarily polarized light beam without diffraction, and the second diffraction grating diffracts the linearly polarized light beam of wavelength $\lambda_1$ having the first polarization plane as an ordinarily polarized light beam and generates at least $0^{th}$ and $\pm 1^{st}$ order diffraction light beams to be used as tracking beams;

a third diffraction grating including a grating material forming a concavo-convex shaped grating and a filler filling the concavo-convex portion of the grating material, wherein the refractive indices of the grating material and the filler for the light beam of wavelength $\lambda_1$ are equal so as to transmit the light beam without diffracting and the refractive indices of the grating material and the filler are different for the light beam of wavelength of $\lambda_2$ so as to diffract an amount of the light beam detectable by the photo detector; and a fourth diffraction grating configured to transmit without diffraction the linearly polarized light beam of wavelength $\lambda_1$ having a second polarization plane, to diffract an amount of a linearly polarized light beam of wavelength $\lambda_1$ detectable by the photo detector and having a first polarization plane perpendicular to the second polarization plane, and to transmit without diffraction a linearly polarized light beam of wavelength $\lambda_2$ having a second polarization plane;

wherein a light-input side of the first diffraction grating and a light-output side of the second diffraction grating are each provided with a phase plate configured to generate a phase difference of an integer times of wavelength for the incident light of wavelength $\lambda_2$, and to rotate the polarization plane of the light beam of wavelength $\lambda_1$ by ninety degrees, respectively.

7. A double-wavelength light source unit including a double-wavelength light source emitting two light beams of linearly polarized light of different wavelengths from different emission points, a photo detector and a double-wavelength diffraction element for transmitting the two light beams of different wavelengths $\lambda_1$ and $\lambda_2$, the double-wavelength diffraction element comprising:

a first diffraction grating including a birefringent grating material forming a concavo-convex shaped grating and a filler filling the concavo-convex portion of the grating material, wherein an ordinary refractive index $n_0$ of the birefringent grating material is substantially equal to a refractive index $n_s$ of the filler, and an extraordinary refractive index direction of the birefringent grating material is configured so that the first diffraction grating transmits the linearly polarized light beam of wavelength $\lambda_1$ having a first polarization plane as ordinarily polarized light beam without diffraction, and the first diffraction grating diffracts the linearly polarized light beam of wavelength $\lambda_2$ having a second polarization plane perpendicular to the first polarization plane as an extraordinary polarized light beam and generates at least $0^{th}$ and $\pm 1^{st}$ order diffraction light beams to be used as tracking beams;

a second diffraction grating including a birefringent grating material forming a concavo-convex shaped grating and a filler filing the concavo-convex portion of the grating material, wherein an ordinary refractive index $n_0$ of the birefringent grating material is substantially equal to a refractive index $n_s$ of the filler, and an extraordinary refractive index direction of the birefringent grating material is configured to be perpendicular to the extraordinary refractive index direction of the birefringent grating material of the first diffraction grating, so that the second diffraction grating transmits the linearly polarized light beam of wavelength $\lambda_2$ having the second polarization plane as an extraordinarily polarized light beam without diffraction, and the second diffraction grating diffracts the linearly polarized light beam of wavelength $\lambda_1$ having the first polarization plane as an ordinarily polarized light beam and generates at least $0^{th}$ and $\pm 1^{st}$ order diffraction light beams to be used as tracking beams;

a third diffraction grating including a grating material forming a concavo-convex shaped grating and a filler filling the concavo-convex portion of the grating material, wherein the refractive indices of the grating material and the filler for the light beam of wavelength $\lambda_1$ are equal so as to transmit the light beam without diffracting and the refractive indices of the grating material and the filler are different for the light beam of wavelength of $\lambda_2$ so as to diffract an amount of the light beam detectable by the photo detector; and a fourth diffraction grating configured to transmit without diffraction the linearly polarized light beam of wavelength $\lambda_1$ having a second polarization plane, to diffract an amount of a linearly polarized light beam of wavelength $\lambda_1$ detectable by the photo detector and having a first polarization plane perpendicular to the second polarization plane, and to transmit without diffraction a linearly polarized light beam of wavelength $\lambda_2$ having a second polarization plane;

wherein a light-input side and a light-output side of a diffraction grating, constituted by the first diffraction grating and the second diffraction grating, are each provided with a phase plate configured to generate a phase difference of an integer times of wavelength for the incident light of wavelength $\lambda_2$, and to rotate the polarization plane of the light beam of wavelength $\lambda_1$, by ninety degrees, respectively.

8. The double-wave-length light source unit according to claim 6, wherein the light-output side of the double-wavelength diffraction element is provided with a second phase plate configured to generate a phase difference of an odd number times of $\lambda_1/4$ for the light beam of wavelength $\lambda_1$.

9. The double-wave-length light source unit according to claim 7, wherein the light-output side of the double-wavelength diffraction element is provided with a second phase plate configured to generate a phase difference of an odd number times of $\lambda_1/4$ for the light beam of wavelength $\lambda_1$.

10. The double-wave-length light source unit according to claim 8, wherein said second phase plate generates a phase difference of an integer times of $\lambda_2$ for the light beam of wavelength $\lambda_2$.

11. The double-wave-length light source unit according to claim 9, wherein said second phase plate generates a phase difference of an integer times of $\lambda_2$ for the light beam of wavelength $\lambda_2$.

12. The double-wave-length light source unit according to claim 5, further comprising an objective lens.

13. The double wavelength light source unit according to claim 6, further comprising an objective lens.

14. The double wavelength light source unit according to claim 7, further comprising an objective lens.

* * * * *